(No Model.)

H. E. KELLEY.
CHECK HOOK.

No. 468,024.

Patented Feb. 2, 1892.

Witnesses:
Friedrich Gustav Wilhelm
Emil Neuhart

H. E. Kelley Inventor.
By Wilhelm & Bonner
Attorneys.

UNITED STATES PATENT OFFICE.

HARRY E. KELLEY, OF NIAGARA FALLS, NEW YORK, ASSIGNOR, BY DIRECT AND MESNE ASSIGNMENTS, OF ONE-HALF TO FELIX M. WOOLWORTH, OF SAME PLACE.

CHECK-HOOK.

SPECIFICATION forming part of Letters Patent No. 468,024, dated February 2, 1892.

Application filed June 17, 1891. Serial No. 396,563. (No model.)

*To all whom it may concern:*

Be it known that I, HARRY E. KELLEY, a citizen of the United States, residing at Niagara Falls, in the county of Niagara and State of New York, have invented new and useful Improvements in Check-Hooks, of which the following is a specification.

My invention relates to that class of check-hooks which are pivoted to a base-plate secured to the saddle, so that the hook may be swung into an open or closed position for attaching or releasing the checkrein.

The object of my invention is the production of a simple and neat check-hook of this type which will permit of a ready attachment and detachment of the checkrein, and which is not liable to accidentally swing open and release the checkrein.

Figure 1:
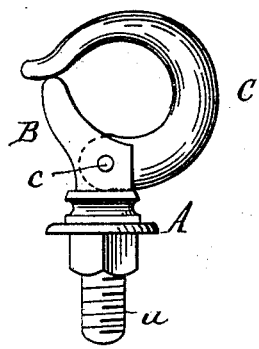
Figure 2:
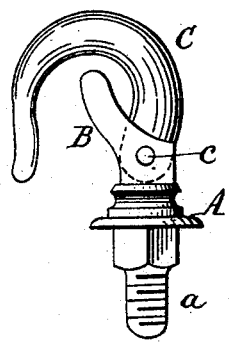
Figure 3:
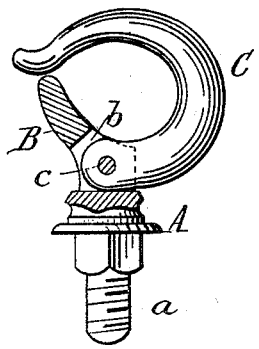
Figure 4:
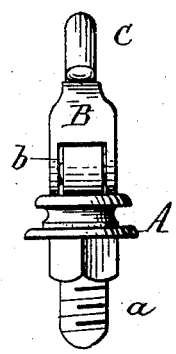

In the accompanying drawings, Figure 1 is a side elevation of my improved check-hook, showing the same in a locked or closed position. Fig. 2 is a similar view showing the same in an open or unlocked position. Fig. 3 is a sectional elevation thereof. Fig. 4 is a rear elevation of the hook in its closed position.

Like letters of reference refer to like parts in the several figures.

A represents the base or base-plate of the hook, having the usual screw-shank $a$ or other means for securing it to the saddle of the harness.

B is a solid arm rising from the base-plate and provided in its lower portion with a slot or recess $b$.

C is the check-hook, pivoted with its shank in the recess of the standard by a horizontal pin or rivet $c$ and capable of swinging in front of the post, as represented in Figs. 1 and 3, or in rear thereof, as represented in Fig. 2.

The arm projects upwardly above the pivot of the check-hook, and the latter when closed extends forward from its pivot and thence upward and rearward, its nose resting upon or terminating adjacent to the upper end of the arm, so that the arm closes the mouth or space between the shank and the nose of the hook and confines the checkrein in the hook. The hook is caused to remain in this position by gravity, and it is prevented from falling below this position by its nose coming in contact with the top of the post or its shank striking the upper side of the base-plate. Upon swinging the check-hook backwardly to the position shown in Fig. 2 its nose stands at a short distance in rear of the arm B, leaving the mouth of the hook open for the insertion and removal of the checkrein.

In attaching the checkrein to the hook the latter is swung backwardly, the checkrein is passed into the bight of the hook, and the hook is then swung forwardly, thus closing the hook and keeping the rein therein. The checkrein is readily detached by swinging the hook backwardly.

My improved check-hook is neat in appearance and reliable in operation. It employs no springs or catches which are liable to get out of order, and its simple construction enables it to be cheaply manufactured.

I claim as my invention—

A check-hook comprising a screw-threaded shank and a solid arm projecting upwardly therefrom and having a recess in its lower portion, in combination with a hook for the checkrein, having its heel pivoted in said recess, the hook when in its normal position extending forwardly from its pivot and thence upwardly and around with its nose in contact with the top of the arm to close the hook and adapted to be swung backward until the nose extends behind the arm to open the same, as described.

Witness my hand this 9th day of June, 1891.

HARRY E. KELLEY.

Witnesses:
 JNO. J. BONNER,
 FRED. C. GEYER.